United States Patent

[11] 3,631,238

[72] Inventor Neel C. MacDonald
Thousand Oaks, Calif.
[21] Appl. No. 877,358
[22] Filed Nov. 17, 1969
[45] Patented Dec. 28, 1971
[73] Assignee North American Rockwell Corporation

[54] METHOD OF MEASURING ELECTRIC POTENTIAL ON AN OBJECT SURFACE USING AUGER ELECTRON SPECTROSCOPY
14 Claims, 8 Drawing Figs.

[52] U.S. Cl. ........................................ 250/49.5 A, 250/49.5 R
[51] Int. Cl. ........................................ H01j 37/26, G01n 23/00
[50] Field of Search ............................. 250/49.5 R, 49.5 A

[56] References Cited
UNITED STATES PATENTS
3,461,306 8/1969 Stout et al. .................... 250/49.5

OTHER REFERENCES
" Scanning Electron Microscopy" by C. W. Oatley et al. Advances in Electronics and Electron Physica, Academic Press, New York, Volume 21, 1965, pages 202, 207- 209 & 222- 228.

" Cylindrical Capacitor as an Analyzer I. Nonrelativistic Part" by H. Z. Sar-el from The Review of Scientific Instruments, Vol. 38, No. 9, Sept., 1967, pages 1210- 1216.

Primary Examiner—William F. Lindquist
Attorneys—L. Lee Humphries, Thomas S. MacDonald and Allan Rothenberg ABSTRACT: A method and apparatus for quantitatively measuring potential on surfaces with submicron spatial resolution employs conventional scanning electron microscope and electron energy analyzer to obtain potential measurements and, in effect, a map of potential at different points on a surface such as a semiconductor or integrated circuit device. A micrograph of the surface to be analyzed is employed to locate points at which potential is to be measured. An Auger electron spectrum including several Auger peaks characteristic of secondary electrons emitted from a point of known potential on which the electron beam of the microscope impinges is first obtained. Then either the potential on the surface at that point is changed or the electron beam is moved to a second point and a second Auger electron spectrum is obtained. The magnitude of the shift in corresponding Auger peaks from the first spectrum to the second spectrum constitutes a direct quantitative measure of the potential of the second point with respect to the potential of the first point.

INVENTOR.
NOEL C. MACDONALD

BY Thomas S. MacDonald
ATTORNEY

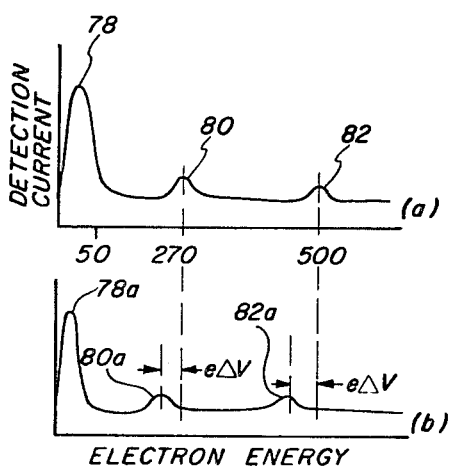
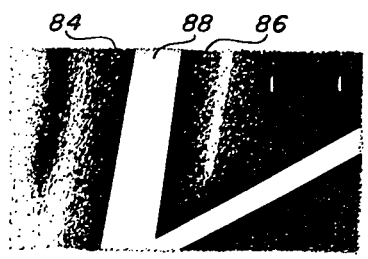
FIG. 3
FIG. 4
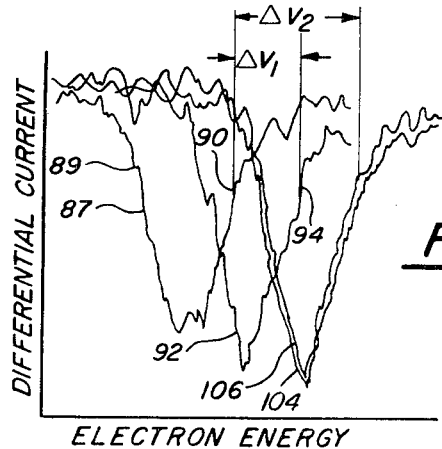
FIG. 5
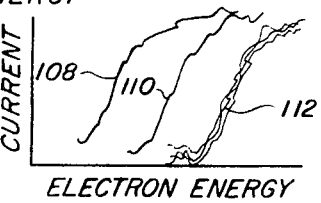
FIG. 6
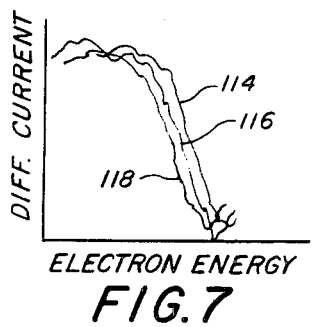
FIG. 7
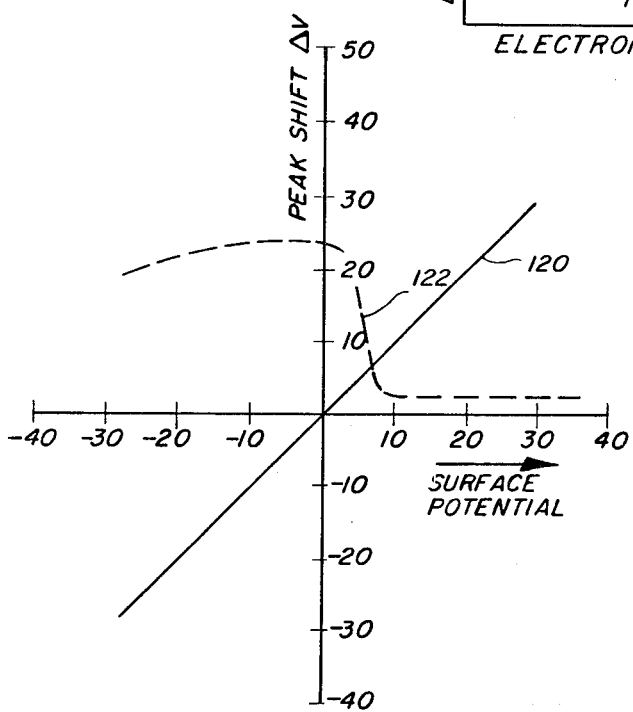
FIG. 8
INVENTOR.
NOEL C. MACDONALD
BY Thomas S. MacDonald
ATTORNEY

METHOD OF MEASURING ELECTRIC POTENTIAL ON AN OBJECT SURFACE USING AUGER ELECTRON SPECTROSCOPY

BACKGROUND OF THE INVENTION

1. Field of the Invention

The present invention relates to the measurements made with electron microscopes and more particularly concerns the use of Auger electron spectra for measurement of electric potential.

2. Description of the Prior Art

The scanning electron microscope, principles of which have been known and employed for decades, may be described as a closed circuit television system. An electron beam is focused to a very small diameter spot or probe which is then scanned in a raster pattern over the specimen surface. A cathode-ray tube is scanned simultaneously in an identical but larger raster pattern. Therefore, a one-to-one spatial correspondence exists between any point on the scanned area of the specimen and the corresponding point on the scanned area of the cathode-ray tube screen. Electrons of the beam are, in part, reflected from the surface and, concomitantly, points on the surface illuminated by the primary beam are excited to cause emission of secondary electrons. In a common mode of operation, the normal to the specimen that is subjected to the bombardment of an electron beam is positioned at about a 45° angle to the axis of the beam. In this configuration, the secondary electron current produced by the primary beam varies with a number of factors including specimen geometry. This secondary electron current is collected, amplified, and employed to modulate the cathode-ray tube brightness to produce an image related to the specimen. The image on the screen or a permanent record thereof obtained by photographing is termed a reflection-scanning electron micrograph, or more generally, a micrograph. The resulting micrograph provides a picture that is somewhat analogous to an optical picture and includes a contrast that results from a number of different factors. Contrast results to a large extent from surface topography, angle of incidence of the electron beam, the direction of emission of the secondary electrons, and the relative positions of specimen and collector. Contrast also results from the chemical nature of the specimen and is known also to result from potential variations on the surface of the specimen. In particular, the micrograph which is made by collecting secondary electrons of relatively low energies, normally defined as electrons having an energy less than 50 ev. will vary with electron potential at the surface because the trajectories of the secondary electrons are sharply curved and depend quite markedly on the potential of the specimen relative to the potential of the final collector system. Scanning electron microscopy theory, construction of apparatus, and applications thereof are described in detail in an article entitled, "Scanning Electron Microscopy," C. W. Oatley, W. C. Nixon, and R. F. W. Pease, *Advances in Electronics and Electron Physics*, Vol. 21, pages 181-247, published 1965 by Academic Press, Inc., New York.

In a paper entitled, "Contrast Formation in the Scanning of Electron Microscope," published by the Electron Research Laboratory, College of Engineering, University of California, Berkeley, memorandum ERL M161, T. E. Everhart describes certain voltage detection micrographs and other experiments recognizing that the number of low voltage secondary electrons collected by the electron microscope is a sensitive function of specimen potential. Such investigations of potential variations, also described in pages 222 through 228 of the above-mentioned Oatley et al. article, are based upon interpretations of the light-versus-dark contrast on the electron micrograph as qualitative indications of relative potentials on various portions of the specimen surface. No quantitative measurements are available from these arrangements. In fact, in the above-mentioned paper by Everhart, it is shown that the relation between collected secondary electron current and the surface potential of an electrode is highly nonlinear and varies according to a large number of factors which are difficult to identify and correlate. Such nonlinearity is still further complicated for a practical specimen where surface potential and surface topography are not uniform. For such a specimen, both the potential and topographical contrasts depend on exact specimen-versus-detector configuration. Electric and magnetic fields at the surface of the specimen, and between the specimen and the detector, are also major factors in micrograph contrasts.

Attempts to measure electric potential by locating the peak of low voltage secondary emission curve have been made as reported by O. C. Wells, and C. G. Bremer in an article entitled, "Voltage Measurement in the Scanning Electron Microscope," *Journal of Scientific Instruments*, 1968, series 2, Vol. 1, page 902. Wells and Bremer attempt to measure the absolute energy of the secondary electrons with an energy analyzer and graphically represent the single low-energy peak as an indication of electric potential on the surface. However, as previously reported and indicated in the above-mentioned paper by Everhart, this secondary electron emission at low voltage is a highly nonlinear function of potential. Among the various nonlinearities are the large susceptibility of this potential indication to transverse electric fields that may exist along the surface of the specimen. In the scheme employed by Wells and Bremer, no provision for mapping potentials at different points on the surface is suggested. Still further in the arrangement of Wells and Bremer, sensitivity to transverse fields is such that, according to the authors, a change in such field would cause the signal in some cases to drop to less than 5 percent of its former value. To avoid this problem, or to counter it, the authors suggest that there by applied a compensating transverse field. Accordingly, no useful or practical quantitative electric potential measurements are available by schemes made known in the prior art.

Another aspect more recently developed in electron microscopy is the study of Auger electron peaks in the energy spectrum of secondary electrons.

Auger electrons are those that have an energy level peculiarly characteristic of the energy levels in the solid material from which they are derived. Thus when a particular material is energized with an electron beam, the transition of electrons between such energy levels for a given material is of high probability. Thus there will be a maximum number of Auger electrons or secondary electrons of this particular energy emitted by various materials. Since there is a larger number of electrons of this particular energy level peculiar to a specific material, an increase in the secondary electron current is manifested. Nevertheless, since it is the energy level that is characteristic of or identifies the particular Auger electron, it will be readily appreciated that the Auger electron spectra can be obtained only from secondary electrons emanating from a very narrow layer, on the order of 10 Angstroms or less at the surface of the specimen. This is true because electrons emitted from points further below the surface lose energy during their passage through the specimen. A recent study of use of Auger electrons is reported in a paper by L. A. Harris entitled, "Analysis of Materials by Electron-Excited Auger Electrons," published in the *Journal of Applied Physics*, Vol. 39, No. 3, 15 Feb. 1968, page 1419. Harris shows apparatus and equipment for making an Auger analysis and employs Auger peaks to obtain a qualitative analysis of materials on the surface of the specimen. Harris employs Auger analysis to identify residues from organic cleaning solvents. Formation of tenacious carbon or carbide layers on materials etched with organic agents was also demonstrated. Harris suggests no recognition of any quantitative measurements obtained through Auger analysis and makes no reference to the use of Auger peaks for electron potential measurements.

The problem of electric potential measurements with a high degree of spatial resolution is fundamental to broad areas of scientific research and analysis and to the study and development of new devices. All events that occur in a solid are due to interaction between protons and electrons and such interactions are directly related to various electric potentials involved In a semiconductor device or the recently developed integrated or microcircuit arrangements, many events of interest occur on the surface, and, of course, are directly dependent upon surface potential differences. It is significant, in design, development, analysis, and testing of such semiconductor devices and microcircuits, that variations and values of electric potential at the surface be available with maximum spatial resolution. Knowing the potential distribution along the surface, various characteristics and modes of operation of the device or circuit can then be optimized.

In electric potential measurements and analyses of semiconductor or microcircuit surfaces according to known techniques, a fine electrically conductive probe such as a tungsten wire of 1 or 2 microns in diameter is moved along the surface to make measurements of the potential. Of course, the spatial resolution in such an arrangement is limited to the size of the probe. Not only are such measurements excessively time consuming, but application of the probe to the surface causes disturbances of the surface either physically or electrically, since in some cases the probe itself may cause a current flow and thus disturb the potential that is to be measured.

In some arrangements, it is common to construct a large-scale device, analogous to the miniature device to be actually manufactured in quantity, and then determine electric potential and potential distributions along its surface. Having thus determined such potential in a device of enlarged dimensions which is more readily accessible to conventional measurement techniques, extrapolation of various potential characteristics from the large dimension to the smaller dimension is then attempted. Such extrapolation is subject to great inaccuracy since the desired active characteristics of the semiconductor material and devices are not necessarily linear with size, and it is difficult to scale the actual geometry of such devices.

In a typical transistor, the width of the base may be in the order of 1,000 Angstroms (0.1 microns). Typical dimensions of the active region of the transistor would be about 5 microns. Thus if it is necessary or desirable to obtain potential measurements at some 20 to 30 potential points within such an area, one needs a resolution of at least 0.1 microns, a resolution that is far beyond resolutions available with present measuring techniques.

SUMMARY OF THE INVENTION

In carrying out the principles of the present invention according to a preferred embodiment thereof, a method of measuring electric potential with high spatial resolution involves the steps of impinging upon the surface of a specimen to be measured first and second electron beams to thereby stimulate first and second emissions of secondary electrons therefrom. The method includes detection of an Auger peak in each of the first and second secondary electron emissions and indication of the effective energy shift of the detected peak of the first emission relative to the detected peak of the second emission. The method is based upon the discovery that the position of a particular Auger peak in the energy level spectrum is dependent upon potential of the surface and substantially independent of voltage or current of the impinging electron beam.

A micrograph of the surface to be measured is first made and a point of known or reference potential on the surface is selected by use of the micrograph. The electron beam of a scanning electron microscope is then directed to the point of known or reference potential by moving the specimen or deflecting the beam and an energy spectrum of the emitted secondary electrons over a range of energy levels including at least one Auger peak is produced. The electron beam is then caused to impinge upon a second point or upon the same point subjected to a different environment to thereby acquire a different or unknown potential; and again, the energy spectrum of secondary electrons emitted is presented over a range of energy levels including the first Auger peak. The shift in energy level of the one Auger peak with respect to the other is a direct quantitative measurement of the difference in potential between the two points subject to the impinging electron beam.

BRIEF DESCRIPTION OF THE DRAWINGS

FIG. 3 comprises a pair of graphs of secondary electron energy spectra illustrating shifts in identified Auger peaks;

FIG. 4 represents a micrograph of a typical semiconductor device;

FIGS 5, 6, and 7 comprise graphic representation of differentiated Auger peaks and the shifts thereof due to different potential on a surface, and FIG. 8 illustrates the linearity of the energy level shift with applied potential for Auger peak measurement in accordance with this invention as compared with the nonlinearity of conventional potential measurement employing a low voltage secondary electron.

DESCRIPTION OF THE PREFERRED EMBODIMENT

Figure 1:
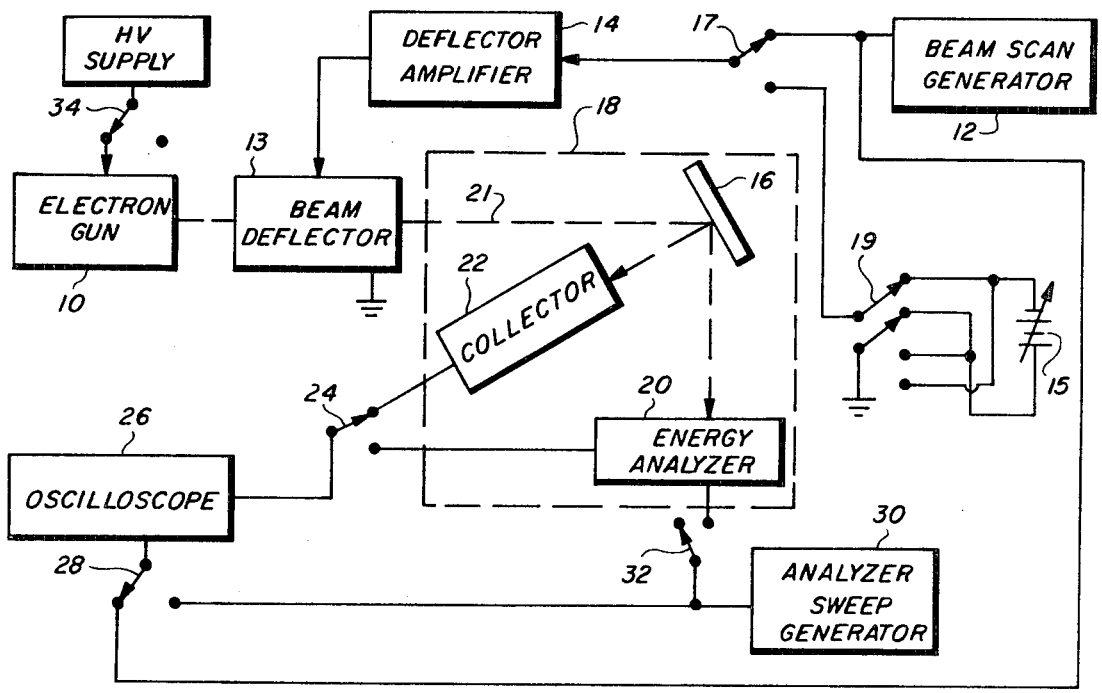
FIG. 1 is a block diagram of equipment employed in the practice of this invention.

Illustrated in FIG. 1 is an arrangement of substantially conventional components and equipment that is adapted to be used in performance of the present invention. A scanning electron microscope includes an electron gun 10 operated under control of a set of conventional electronics including a beam deflector 13, controlled from a deflector amplifier 14, and alternatively, via a switch 17, from a beam scan generator 12 or a manually controlled potential source 15 and a switch 19 which is ganged for operation in unison with switch 17. The controls operate to cause the gun to direct a beam of electrons 21 toward a specimen mounted upon a movable specimen holder 16 contained within a target chamber 18. Electrons ejected or reflected from the specimen at a point subject to impingement by the relatively high voltage beam 21 are collected by a first detector in the form of an energy analyzer 20 and a second detector shown as a collector 22, both of which are mounted within the evacuated specimen chamber 18. The output of the collector 22, an electrical signal representative of the number of emitted or reflected electrons received thereby is fed via a switch 24, when in the illustrated position thereof, to a recording device such as an oscilloscope 26. The latter also receives via a switch 28 a scan control signal from beam scan generator 12. With the switches 24 and 28 in the positions thereof not illustrated in FIG. 1, the output of the energy analyzer 20 is fed via the switch 24 to the oscilloscope 26. When the oscilloscope is supplied with signals from the energy analyzer, the scope 26 is fed with a sweep voltage from an analyzer sweep generator 30 via the switch 28. A fourth switch 34 may be operated repetitively to pulse a high-voltage supply 11 that accelerates the beam 14. The beam may also be pulsed by deflecting the beam completely off the specimen.

A number of scanning electron microscopes available today may be employed in the practice of this invention. For example, the scanning electron microscope described in the above-mentioned article by Oatley, Nixon, and Pease and illustrated on page 202 thereof may be employed in the practice of this invention. In an actual embodiment of the invention, there has been employed the scanning electron microscope produced by and available from the K-Square Corporation of Pittsburgh Pennsylvania. In such a microscope as is well known, there is produced by the electron gun a fine beam of high-voltage electrons sharply focused by magnetic lenses onto the specimen surface in an extremely small spot. Spot sizes of the beam at the specimen on the order of 200 angstroms (A) and less are available. The magnetic deflection coils move the spot across the surface of the specimen in a scanning sequence similar to that used in a television raster. As the high-energy primary electrons strike the specimen, they cause the specimen to emit lower energy electrons in quantities determined by the primary beam voltage and current, the nature of the specimen material in the immediate proximity of the impinging spot, and the electron beam incidence angle. A portion of these emitted electrons is collected and detected by the collector 22 which may comprise a conventional scintillator, light pipe and photo multiplier such as described in the above-referenced article by Oatley, Nixon, and Pease and illustrated on page 198 thereof. Theory, operation, and construction of such a collector are described in an article by T. E. Everhart and R. F. M. Thornley entitled, "Wide Band Detector for Micro-Microampere Low-Energy Electron Current," published in the *Journal of Scientific Instruments*, Vol. 37, 1960, pages 246–248.

The collector current output is amplified and employed to control the brightness of the display cathode-ray tube or oscilloscope 26 whose electron beam is moved in synchronism with the primary beam on the specimen by means of the application to the scope deflection coils of the scan signal from the scan generator 12. The display cathode-ray tube or oscilloscope screen thus presents an image of the specimen surface.

The electron gun is provided with suitable voltage and current controls and scanning is accomplished by a set of magnetic or electrostatic deflection coils mounted within the gun lenses and energized by the scan signal from scan generator 12 or manual control 15.

Also mounted within the evacuated target chamber 18 is the energy analyzer 20 which produces a signal representing the energy spectrum of the emitted secondary electrons. Various types of energy analyzers may be employed in the practice of this invention including both the retarding filed and velocity analyzer spectrometers. Typical spherical deflector and cylindrical mirror analyzers are described in an article by H. Hafner, J. Arol Simpson, and C. E. Kuyatt entitled, "Comparison of the Spherical Deflector and the Cylindrical Mirror Analyzers," published in the *Review of Scientific Instruments*, Vol. 39, No. 1, pages 33–35, Jan. 1968. Also useful as an energy analyzer in the performance of this invention is the cylindrical capacitor apparatus described by H. Z. Sar-El in an article entitled, "Cylindrical Capacitor as an Analyzer," published in the *Review of Scientific Instruments*, Vol. 38, No. 9, pages 1210–1216, Sept. 1967.

Figure 2:
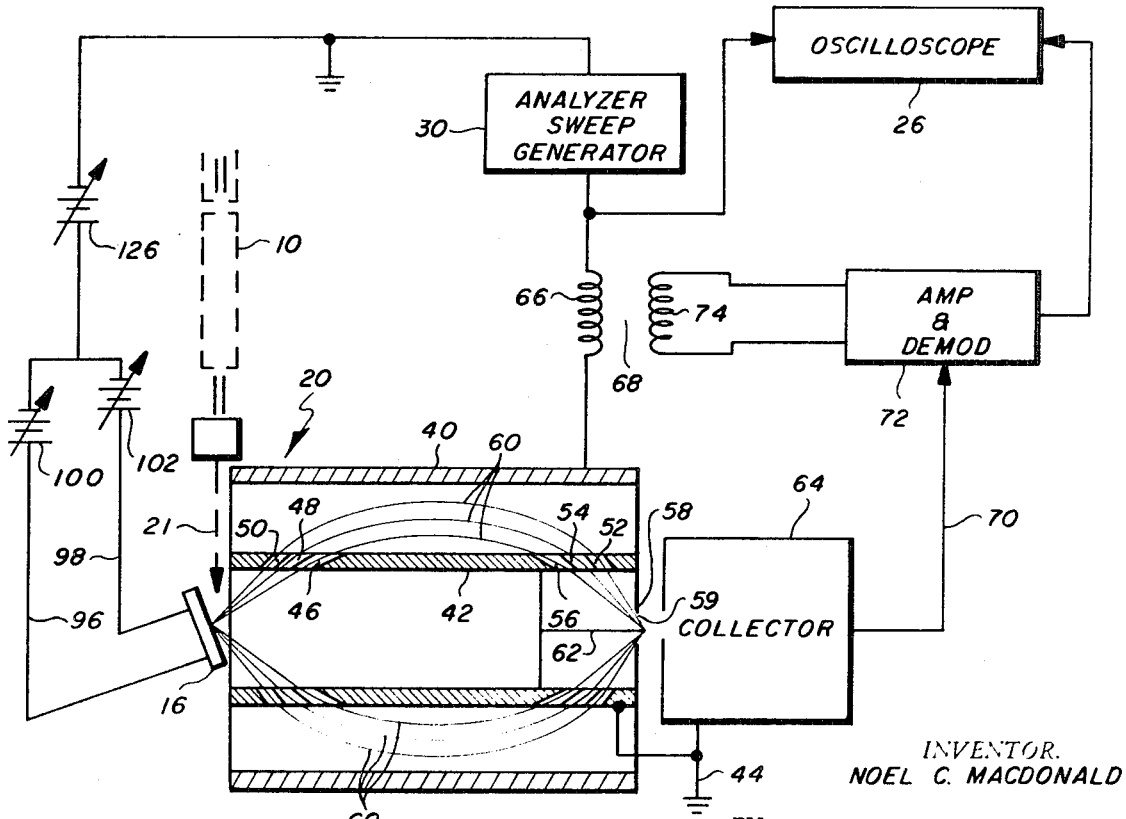
FIG. 2 illustrates additional details of the equipment of FIG. 1 including an Auger electron spectrometer useful in the practice of this invention.

Further details of portions of the apparatus employed in the Auger spectrum analysis are illustrated in FIG. 2. In this figure, there is shown the electron gun 10 directing its electron beam 21 at the target specimen 16 from whence emitted secondary electrons are received by the energy analyzer 20. The latter takes the form of the coaxial cylinder velocity analyzer having relatively high transmission and a geometrical configuration particularly suitable for Auger spectroscopy. The coaxial cylinder analyzer is of the type described in detail in the aforementioned article by Hafner, Simpson, and Kuyatt.

Briefly, the analyzer 20 comprises a pair of electrically conductive, mutually insulated coaxial cylinders 40, 42 of which the latter is grounded via lead 44. The inner cylinder 42 is provided with one or more slits 46, 48, and 50 at the front end thereof and a like number of slits 52, 54, and 56 at the output end thereof. The number of slits may vary as deemed necessary or advisable. An end plate 58 has an output aperture 59 through which deflected electrons transversing the path or paths indicated at 60 are emitted from the analyzer. A plate 62 is carried by the inner cylinder, bisecting the terminal portion of this cylinder and having an edge portion extending in close proximity to output aperture 59. Slits 46 through 56 each extends substantially continuously around the circumference of the inner cylinder of the spectrometer for a distance to 300 or more degrees.

A negative voltage, $V_A$, is supplied to the outer cylinder 40 and the inner cylinder 42 is grounded as previously indicated. With such a negative voltage on the outer cylinder, electrons with an energy $E=AeV_A$ and an energy spread $\Delta E$ are transmitted by the spectrometer. The constant A is a factor determined and defined by the geometry of the spectrometer. For example, in a spectrometer employed in the practice of this invention, this constant is equal to 1.6. Energy resolution $\Delta E/E$ for such a spectrometer is found to be less than 1 percent.

In operation, the spectrometer in effect selects for transmission through its output aperture 59 only those electrons with a particular energy level. Such an energy level is dependent upon the magnitude of the negative voltage, $V_A$, applied to the outer cylinder 40. Thus if such negative voltage applied to the outer cylinder is varied as by providing a sweep voltage from generator 30, the electrons transmitted by the spectrometer will progressively be those with differing energy levels whereby an energy spectrum of emitted electrons is produced. Electrons transmitted through the output aperture 59 are received by a conventional collector 64 which may be substantially identical to the collector 22 illustrated in FIG. 1, comprising a scintillator-light pipe-photomultiplier tube arrangement previously described herein. Since it is desired to mount as little equipment as possible inside the target chamber, only the electron-receiving portion, the coaxial cylinder and scintillator, of the analyzer need by positioned within the chamber. The light pipe extends through the chamber wall to the photomultiplier tube of the collector which is mounted outside the chamber. Similarly, only the electron-receiving portion of collector 22 need be mounted within the chamber.

The sweep voltage $V_A$ applied to the outer cylinder 40 is provided by the analyzer sweep generator 30 via the primary 66 of a transformer 68. The analyzer sweep generator provides a progressively increasing (in a negative direction) voltage upon which is modulated a suitable AC signal such as a 1 to 2 volt peak-to-peak signal at 50 kHz. The output of collector 64, a signal representing the secondary electron emissions distributed over their energy spectrum and modulated by the 50 kHz. signal is fed via a lead 70 to the input of a synchronous demodulator and amplifier 72 which has as a second input thereof, an AC reference signal derived from the secondary 74 of the transformer 68. The synchronous demodulation of the output of collector 64 provides in effect the derivative of the secondary electron distribution to thereby afford significant signal enhancement and noise reduction. The demodulation output of amplifier 72 is fed to the Y-axis control of the cathode-ray tube 26 which, for the display of the energy spectrum of the secondary electrons, has its beam deflected in the X-axis direction by the output of the analyzer sweep generator.

With the arrangement described in FIGS. 1 and 2, it will be seen that within the evacuated target chamber there are provided two different electron detectors. The first indicated in FIG. 1 at 22 is a conventional collector of low-energy electrons; and the second, indicated in this figure and also shown in FIG. 2, is the high-energy electron analyzer 20. These two detectors are used one after the other in the practice of the method of this invention. When the collector 22 is employed as in conventional operation for the production of a micrograph of the specimen that is the target of the scanning beam of the electron gun, all of the switches 17, 24, 28 and 32 of FIG. 1 are in the position illustrated. In this arrangement, the scope and electron gun both receive the scanning signal from scan generator 12; and the scope screen displays thereon the signal produced by collector 22, representing the relatively low-energy secondary electrons emitted from the specimen. For making such micrograph, it will be seen that the energy analyzer 20 and the analyzer sweep generator 30 are disconnected from the operative portion of the equipment. For presenting the Auger spectrum, the collector 22 is moved from a position in proximity to the target holder or specimen holder, 16, and the energy analyzer 20 is moved into proximity with the specimen so that the secondary electrons emitted from the specimen will be received by the spectrometer. It will be readily appreciated that conventional means (not shown) may be employed for mounting the collector 22 and energy analyzer 20 within the target chamber 18 so that either or both may be selectively moved at will to and from an operative position closely adjacent to the specimen. Because of the greater transmission losses of the velocity analyzer, spectrometer 20, it is desirable that this instrument be located with its acceptance aperture closely adjacent to the target specimen. Such proximity, however, is not required for the collector 22 which is adapted to receive much greater quantities of secondary electrons and thus produce a higher current.

In practice, it has been found that where both of the detectors 22 and 20 are mounted within the target chamber, it is not necessary to provide for movement of collector 22 since this collector may be mounted in such a position as to operatively receive emitted electrons despite the fact that the spectrometer 20 is fixedly positioned closely adjacent the specimen. It will be understood, nevertheless, that even though the collector 22 may always receive the secondary emitted electrons, it will be electrically disconnected from the rest of the apparatus as by operation of switch 24, for example, when the spectrum 20 is employed for spectrum analysis. In the latter situation, to obtain the Auger electron spectrum, all of the switches are moved to nonillustrated positions thereof whereby the oscilloscope is fed with a sweep voltage from the analyzer sweep generator 30. The same sweep voltage is fed to the energy analyzer as illustrated in FIG. 2, and the output of the energy analyzer is fed via switch 28 to the scope 26. In this arrangement, of course, the electron gun no longer has its deflection controlled by the scan generator 12, but as will be described below, the position of the beam 21 is preferably manually manipulated by control of potential source 15 to direct it to a relatively steady position at a point on the surface of the specimen to be analyzed.

Use of the described apparatus in the practice of this invention employs Auger electron peaks. Auger electrons are those emitted after excitation by the primary electron beam or secondarily by X-ray radiation excited by the primary beam. When, upon excitation by the primary beam from the electron gun, an atom of the specimen loses an electron from an inner level, it will tend to return to its normal state by absorption of an of an electron from an upper level. The energy released in this transition appears in the form of an Auger electron ejected from a nearby upper level. Thus the Auger electron is uniquely identifiable by its energy level, and concomitantly, an Auger spectrum of energy levels, uniquely identifies the composition of the solid from which it emanates. Thus the energy level spectrum of the particular Auger electron is characteristic of the energy level of the excited solid material. For materials with low atomic numbers, relatively large numbers of Auger electrons are emitted. For materials with higher atomic numbers, the Auger electrons from the higher L, M, N, etc., levels are measured but the peaks become closely spaced and much more difficult to distinguish.

Thus a spectrograph of secondary electrons from a point on the surface of a specimen that is illuminated by the electron beam of the microscope may appear as illustrated in FIG. 3(2) which comprises a graph of electron energy plotted against detector current, that is, current at the output of a detector such as spectrometer 20. It will be seen in this graph of distribution of secondary electrons according to energy level that the highest peak occurs at exceedingly low energy levels, well below the 50 electron volt level. The height of this peak 78 represents the density of electrons at the indicated energy levels and evidences the fact that by far the largest quantity of secondary electrons exist at these relatively low-energy levels, below 50 electron volts. Illustrated in FIG. 3(2) are two additional peaks of considerably lesser magnitude, peak 80 at energy level of about 270 volts and peak 82 at energy level of about 500 electron volts. These are the Auger electron peaks of Carbon and Oxygen, respectively, the position of these peaks on the energy scale being characteristic of these elements in the composition of the specimen as indicated above.

In accordance with principles of this invention, electric potential upon the surface of the specimen is measured by detecting a shift in the Auger peaks such as peaks 80 and 82. Consider that the spectrograph of FIG. 3(a) is produced by the beam of an electron gun impinging upon a particular point on the surface of the specimen. Now assume that the position of impingement of the beam is changed as by deflecting the beam or by moving the specimen such that the beam impinges on a point on the surface whose potential is $\Delta V$ with respect to the potential at the point at which the beam first impinged to obtain a graph of FIG. 3(2). Accordingly, with the beam impinging upon such a second point, an energy level spectrum is obtained. This second spectrum is illustrated in FIG. 3(b), again showing the low level major secondary electron peak 78a, the Carbon Auger peak 80a and the Oxygen Auger peak 82a. Note that peak 80a has been shifted to the left with respect to peak 80 by an amount $e\Delta V$. Likewise, peak 82a has been shifted with respect to peak 80 by the amount $e\Delta V$. This shift in the position of the Auger peak is linearly proportional to the difference in potential between the two points at which the electron beam impinges for FIGS. 3(2) and 3(b), respectively.

The Auger peak shift is thus detected and measured in the following manner. First, a normal scanning electron microscope micrograph is obtained at a primary beam energy of from 1-30 kev. and a primary beam current of from about $10^{-13}$ to $10^{-5}$ amperes. Such a micrograph of a junction field effect transistor that has been used as a specimen in the practice of the present invention is illustrated in FIG. 4. The dark portions 84, 86 depict the gate electrodes of the semiconductor. The lighter portion 88 between the two gate electrode portions represents the semiconductor drain electrode. The distance XX in this illustration represents a distance of 100 microns. Having obtained the illustrated micrograph and thereafter selecting a portion of the specimen by viewing the micrograph on which potentials are to be measured, a point is then chosen at a known potential as, for example, a point on the gate electrode 86. With this electrode at a known potential, applied to the lead connected thereto, the electron beam is positioned at the selected point on the specimen by operating manual control for the electron beam deflection of the microscope to visually move the beam spot (in the scope) over the face of the micrograph appearing on the scope screen or an overlay thereon. When the representation of the beam on the scope screen is properly positioned, the actual beam is similarly located on the specimen surface.

Generally, to present Auger electron spectra, the same beam voltage and current are employed as used for presenting the micrograph. Nevertheless, the position of the Auger peak is substantially independent of either beam voltage or beam current, since the auger peaks are a function only of the energy level of the individual electrons collected by the spectrometer. A difference in voltage or current of the primary electron beam will result only in a change in amplitude of the peak but will not effect a change in position of the peak along the energy scale. It is noted that it is the relative position of the peak along the energy scale that comprises the basis of the measurement of this invention.

The analyzer sweep generator is now operated with the switches of FIG. 1 all in the nonillustrated positions thereof, to cause the spectrometer 20 to sequentially transmit secondary electrons of different energy levels. These electrons are collected in the detector 64 which provides a signal that is synchronously demodulated in demodulator 72 and fed to the oscilloscope or other recording device to provide the desired spectrograph. Use of the synchronous demodulator provides the derivative of the Auger peak.

For verification of measurements made and to illustrate aspects of calibration of the apparatus, Auger peaks for different voltage levels on gate electrode 86 and drain electrode 88 of the field effect transistor depicted in FIG. 4 are shown in FIGS. 5, 6, and 7.

The micrograph of FIG. 4 was obtained with a primary beam energy $E_b$ of 10 kev. and a primary beam current $I_b$ of 1 microampere. The spatial resolution of this micrograph is approximately 5 microns. With the primary beam incident upon the drain electrode 88 at approximately 30 microns from the gate electrode 86 differentiated Auger peaks for Carbon were recorded for electrode potentials of the gate electrode, $V_g=0$; and of the drain electrode, $V_d = 0, -10$ and $-20$ volts; and also $V_g = 20$ volts and $V_d = -20$ volts. The differentiated peak for $V_d = 0$ and $V_g = 0$ is indicated at 87, having a high-energy side 89 and a low-energy side 90, for the same peak. A point on the high-energy side 90 is chosen as a reference from which to measure a potential on the surface and to measure the peak shift. The second curve 92 represents the condition of a gate voltage $V_g=0$ and a drain voltage $V_d = -10$ volts. The high-energy side of this peak, indicated at 94, is employed to measure the Auger peak shift for this known difference in potential. The shift is illustrated in this figure is $\Delta V_1$. It may be noted that potential on the electrodes of the specimen are controlled by controlling the voltage on leads 96, 98 connected to the specimen electrodes and to variable potential sources 100 and 102, respectively (FIG. 2).

Third and fourth curves representing illustrative Auger peak shifts are indicated at 104, 106, being substantially coincident with each other. These curves represent respectively for the first (104) of these two nearly coincident curves, a drain voltage $V_d$ of $-20$ volts and gate voltage $V_g$ of 0; and for curve 106, a drain voltage $V_d$ of $-20$ volts and a gate voltage of $V_g$ of $+20$ volts.

FIG. 6 shows three curves representing differentiated voltage peaks obtained under conditions similar to those under which curves of FIG. 5 are obtained but illustrating only the high-energy side of the peaks. Curve 108 represents a condition of $V_d=0$ and $V_g=0$; curve 110, a condition of $v_d=-10$ and $V_g=0$, while curve 112 actually represents three separate substantially coincident traces for each of which $v_d=-20$ volts, but where values of $V_g$ are 0, +10, and +20 volts, respectively. The coincidence of curves 104 and 106 of FIG. 5 and the three curves in 112 in FIG. 6 evidences the insensitivity of the identified peak shift to potentials of adjacent electrodes, or to a transverse filed of as much as 6,000 volts per centimeter. All the curves of FIG. 6, like the curves of FIG. 5, are taken with the beam on the drain electrode 88 at a position approximately 30 microns from the gate electrode.

Referring to FIG. 5, it will be seen that the high-energy side of both curves 104 and 106 may be compared with the high-energy side of the curve 90 to identify the peak shift $\Delta V_2$. Each of peak shifts $\Delta V_1$ and $\Delta V_2$ are quantitative measures of the potential difference between different conditions of the same point on the surface. In these situations with the beam on the drain electrode, the potential on the surface thereof was changed via the external voltage control 100 (FIG. 2), for example, to provide the three different voltages levels of 0, $-10$, and $-20$ volts in FIGS. 5 and of 0, $-10$, and $-20$ volts in FIG. 6. These voltage changes on the surface are manifested by the indicated shift in the Auger peak, having magnitudes represented in the drawings as $\Delta V_1$ and $\Delta V_2$. These shifts, as will be pointed out more particularly hereinafter in connection with FIG. 8, are a quantitative measure, of the change in potential of the beam surface. The fact that the change in voltage on adjacent electrodes, creating a significant transverse filed, did not change the position of the Auger peak evidences insensitivity of the present technique to the major source of error of those prior attempts to measure potential that employed only relatively low-energy secondary electrons.

Shown in FIG. 7 are three curves 114, 116, and 118 of the low-energy side of differentiated Auger peaks of Carbon with the electron beam now on gate electrode 86 and with external voltages applied to this gate electrode of 0, +2, and +4 volts, respectively. The position of the peak shifts toward lower energies linearly for linear increases in positive gate electrode potentials with the beam on this gate electrode.

Thus it will be seen that the shift in energy of the Auger peak is a linear function of potential on the electrode; and at the same time, the amplitude of the shifted peak remains sufficiently large to enable measurement of the peak shift. The linearity of the peak shift $\Delta V$ with voltage or potential on the surface being measured is further illustrated by the solid line 120 in FIG. 8 which was obtained by measuring the energy shifts of the Auger peak for Carbon at an energy level of about 270 electron volts, and the energy shifts of the Auger peak for oxygen at a level of about 510 volts.

For comparison, FIG. 8 also shows a dotted curve 122 illustrating the exceedingly nonlinear relationship between the collected secondary electron current and the surface potential for the normal secondary electron mode of scanning electron microscopy. Such a curve may have the same general shape as those that would be obtained by the method of Wells and Bremer in the article mentioned above. Not only is curve 122 nonlinear, but its shape changes as the result of changes in the potential of adjacent electrodes and transverse fields.

An estimate of deflection of an electron due to a transverse electric filed on the surface can be made by calculating the increase in transverse momentum $\Delta P_t$. If the average transverse field $\bar{\epsilon}$ is appreciable over a distance $\bar{x}$ measured normal to the surface, then $$\frac{\Delta P_t}{P} \sim \frac{e\bar{\epsilon}\bar{x}}{2E}$$

where $E$ is the energy and $P$ the momentum of an electron emitted normal to the surface. For an Auger electron with $E = 270$ electron volts in a transverse filed distribution with $\bar{\epsilon} = 10,000$ volts per centimeter and $\bar{x} = 10$ microns, $\Delta P_t/P$ is approximately equal to 0.02. For low-energy electrons (e.g., $E = 10$ electron volts or less), $\Delta P_t$ is greater than or of the same order of magnitude as $P$ and the electrons may never reach the spectrometer. For practical field distributions, it is possible to have most of the low-energy secondary electrons returning the specimen which results in changes of the shape and amplitude of the low-energy peak. The latter is not the case for the higher energy Auger electrons.

The curves of FIGS. 5, 6, and 7 represent measurements of potential differences made at a given point or the same point on the surface of the specimen where the surface potential has been changed by varying external conditions or parameters of the device under consideration. For a situation where the potential at various points on the surface is to be measured and where a potential map of the surface is desired, a similar procedure is employed. A micrograph is first made and a first point on the surface is identified having a known or reference potential. The electron beam is positioned at such point and secondary electrons emitted from such point are received via the spectrometer to obtain the energy level spectrum and identify a particular Auger peak thereof. Then the electron beam is moved to a second point on the surface displaced from the first point by a distance at least greater than the spot width of the beam, that is, a distance preferably greater than several hundred Angstroms but which may be a fraction of a micron. The same (Carbon, for example) Auger peak is identified in the energy level of secondary electrons emitted from this point, and its position in the energy level is presented for comparison with the position of the corresponding Auger peak obtained from the reference point on the specimen surface. The shift in position of the Auger peak of the emission from the first point relative to the corresponding peak of the emission from the second point is a quantitative measure of the absolute electric potential of the second point with respect to the potential of the first point.

The juxtaposed presentation of a pair of relatively shifted Auger peaks is an actual measure of potential since the distance between the peaks is the value of interest. If some other type of potential readout is desired, the signals representing the two spectra may be processed by a computer, using known techniques. Standard electronic circuits and methods may be employed to store signals representing the spectra, for example, and these may then be simultaneously fed to have a digital counter start and stop upon receipt of first and second peak signals.

The described method is readily performed by manual operation of the instrumentation described and illustrated in FIG. 1 and 2. Nevertheless, it will be readily appreciated that present day computers lend themselves to complete control and manipulation of such systems. The method of the present invention may readily be and has been performed under control of a computer which operates the scanning electron microscope to produce and store the micrograph within the computer, storing within the computer the position of points of known or reference potential and then repetitively operating the analyzer sweep generator to make repetitive energy spectra of secondary electrons, and at the same time controlling the position of the primary electron beams of the electron gun to step from point to point. Thus the computer controls the points at which the Auger peaks are taken and may itself present the peaks from successive points for comparison with the Auger peak from the reference points. The computer, also by conventional techniques, will provide a graphical readout in the form of a potential map of the specimen under consideration. With the use of the computer, repeated measurements can be taken of individual peak shifts to provide enhancement of the precision of measurement by signal-averaging techniques.

Where a specimen surface is provided with and, in effect, stores a pattern comprising a large number of potentials that have unknown magnitudes that are variable among a number of levels, or between only two levels, or that are variable throughout a continuous range, the Auger peak shift method described herein may be employed to achieve a rapid nondestructive readout of the stored data.

Still another form of measurement can be employed for identifying the shifts in Auger peaks and correlating these to quantitative measure of surface potential. For such a method a variable voltage source 126 (FIG. 2) is inserted between ground and the point on the specimen where potential is measured. Voltage of the source 126 is then adjusted to produce no shift in the Auger peak for stepping of the primary beam from the reference point to the second point. In other words, with the variable potential source 126 at a given value, a measurement is made at a point of reference potential and the position of the particular Auger peak to be used for this measurement is identified in the energy spectrum. Then the beam is moved to the second point on the surface at which the potential is to be measured, and the position of the Auger peak is noted. In this situation, rather than measure the shift in the position of the Auger peak, the voltage source 126 is varied to cause the second identified Auger peak to coincide in position with the position of the Auger peak obtained from the reference point. For this condition, the potential on the surface at the second position of the beam is directly related to the potential on the reference point plus the amount by which the voltage of variable source 126 was changed to shift the second Auger peak into coincidence with the position with the first Auger peak. In other words, the magnitude of the voltage variation is a measure of the Auger peak shift, and therefore of the surface potential.

A modification of the last method may be employed for conditions of high signal-to-noise ratio at the detector. In this modified method, the sweep voltage applied to the outer cylinder 40 of the spectrometer can be manually adjusted to record the maximum value of a particular Auger peak, that is, the position of maximum detector current level of such peak. Then the change in voltage of variable voltage source 126 that is necessary to reach the same maximum value of the same peak with the beam position at the second point on the specimen surface is equal to the $\Delta V$ or peak shift. In this method, only one point on the Auger spectrum need be employed to measure the potential difference.

Although Auger peaks are present in widely varying energy levels, equipment limitations and practical ranges of instrumentation sensitivities indicate that the present invention is preferably employed with secondary electron energy levels of from 100 to 1,000 volts. Below 100 volts, the Auger peaks are affected by transverse fields and may be difficult to use for potential measurements.

Although the Auger peak is peculiarly representative of the energy level in a solid from which its electrons emanate, the changes in composition of the specimen from point to point in measurements to be made in the practice of the present invention are so small as to be negligible. For all practical purposes, chemical composition variation over measured surfaces will not cause a peak shift of more than 2 to 3 electron volts, and in practice is usually less than 0.2 volts, an amount that is insignificant in the range of values of the peak shift measurements made herein.

It will be readily appreciated that the methods and apparatus described herein for measurement of surface potential with high spatial resolution will find widespread application to study, design, development, and testing of semiconductor and microcircuit devices and, indeed, to any devices or phenomena that are characterized or manifested by surface potentials. The present invention may be employed to analyze microcircuit devices or semiconductor wafers. For example, a nonhomogeneous semiconductor material would exhibit potential variations analogous to those found in PN-junctions.

The present invention may be of use in the area of device construction as well as design. The ability to measure and identify surface potentials can also be a major benefit in failure analysis. As circuit designs go toward minimum separation of less than 0.1 mil spacing and/or geometries, this invention will help to identify and correct problems related to circuit design, improper surface doping, or stray surface conditions affecting the stability of the circuits.

MOS devices are also very sensitive to possible surface potentials which have been identified by theoretical means but not positively measured. The use of the invention described herein could locate the potential, define its magnitude and aid in designing better circuits adapted to overcome such anomalies.

In the filed of passive circuits such as thin films, ladders and multilayer configurations, this invention may aid in necessary design considerations such as optimum thickness of isolation layer, spacing of resistors and interconnections between layers.

For making potential measurements on a surface of a material that does not yield adequate auger peaks in a useful region or in a region of energy levels that is useful with presently available equipment, it is contemplated that the surface be tailored with a material that would be operative in the described method. Accordingly, a thin film of an insulating material such as a hydrocarbon or a nonconducting oxide may be vacuum deposited upon the surface to be measured. In such a situation, the Auger electron will, by definition, emanate only from a surface layer of about 10 Angstroms or less, since all the electrons emanating from deeper within the material are subject to energy losses. The thin film deposited upon the surface to be measured partakes of the potential of the underlying surface whereby measurements made upon such thin film are accurately representative of the immediately underlying surface.

The spatial resolution available with measurements according to the present invention are presently limited only by the minimum spot size available from the scanning electron microscope. The Auger electron, in energy levels of 100 to 1,000 volts, emanates from an area on the surface in the order of 20 to 100 Angstroms in dimensions. Thus, the latter is the theoretical limit of the range of resolution. However, electron beam spot sizes are available commercially only with a beam width of about 100 Angstroms whereby the available resolution can be no grater than this figure.

In summary, a method and apparatus have been described for measuring potential on the surface of a device employing a focused high energy electron beam, preferably on the order of 10 to 15 kev. The shift in energy of the differentiated Auger peak is shown to be linearly related to the potential on the surface and to be substantially insensitive to transverse electric fields. The sue of the Auger spectra for Carbon and other materials obtained through the use of both the normal scanning electron microscope mode of operation and the Auger electron mode of spectroscopy operation provides a method for obtaining quantative measurements of two dimensional potential distribution on specimen surfaces with submicron spatial resolution.

I claim:

1. The method of measuring electric potential on the surface of an object comprising the steps of
   directing an electron beam to a point on a surface at a first potential,
   detecting the energy level of an Auger peak characteristic of secondary electrons emitted from said point,
   directing an electron beam to a point on a surface at a second potential,
   detecting the energy level of an Auger peak characteristic of secondary electrons emitted from said last-mentioned point, and
   determining the shift in energy level of said Auger peak, said determined shift comprising a quantitative measure of potential on said surface between said first- and second-mentioned points.

2. The method of claim 1 wherein said second-mentioned point is spaced from said first-mentioned point.

3. The method of claim 1 wherein said second-mentioned point comprises said first first-mentioned point at a time when the potential thereof may be different from said first potential.

4. The method of claim 1 wherein said step of directing an electron beam to a point at a second potential comprises
   directing said electron beam to said first-mentioned point when the potential thereof may be different from said first potential.

5. The method of measuring electric potential on the surface of an object comprising the steps of
   impinging upon said surface first and second electron beams to stimulate first and second emissions of secondary electrons from either (2) two points on said surface or (b) the same point on said surface at different potentials,
   detecting an Auger peak in each of said first and second secondary electron emissions, and
   measuring the effect of energy shift of the detected peak of said second emission relative to the energy of the detected peak of said first emission,
   said shift comprising a quantitative measure of potential on said surface.

6. The method of claim 5 wherein said beams are caused to impinge upon first and second points on said surface,
   said detecting step comprising the step of analyzing first and second energy spectra of said first and second secondary electron emissions over a range of values including an Auger peak characteristic of a selected material, 7. The method of claim 5 wherein said last two steps include the steps of
   applying a voltage to the point of impingement of said second beam upon said surface,
   varying said voltage until the Auger peak of said second emission coincides with the Auger peak of said first emission, and
   indicating the magnitude of said voltage variation.

8. The method of claim 5 including the steps of
   applying a voltage to said surface,
   varying said voltage until said Auger peak of said first emission attains a maximum energy level position, subsequently causing a second variation of voltage applied to said surface until said Auger peak of said second emission coincides with the Auger peak of said first emission, and
   indicating the magnitude of said second voltage variation.

9. The method of measuring electric potential on the surface of an object comprising the steps of
   impinging an electron beam upon the surface at a first point thereof at a reference potential,
   detecting the energy spectrum of secondary electrons emitted from said first point over a range of energy levels including at least one Auger peak,
   impinging said beam upon the surface at a second point thereof,
   detecting the energy spectrum of secondary electrons emitted from said second point over a range of energy levels including said one Auger peak,
   comparing with said first-mentioned spectrum the energy spectrum of secondary electrons emitted from said second point over a range of energy levels including said one Auger peak, and
   measuring potential between said first and second points as a function of the energy shift of said Auger peak in said energy spectra.

10. The method of claim 9 wherein said last-mentioned step comprises measuring the magnitude of energy level shift of said Auger peak from a position for electrons from said first point to a position for electrons from said second point.

11. The method of claim 9 including the step of making a micrograph of said surface with a scanning electron microscope,
    said first-mentioned step comprising directing the beam of said microscope to a point of said surface at a known potential.

12. The method of claim 9 including the step of identifying upon said surface in relation to positions of representations of the beam upon a micrograph of said surface.

13. The method of measuring potentials at different points of a surface of an object, said points comprising a pattern of potentials of at least two potential levels comprising the steps of
    stimulating emission of Auger electrons from points of said pattern,
    detecting the energy level of Auger peaks characteristic of Auger electrons emitted from respective ones of said points, and
    measuring relative energy levels of said Auger peaks to obtain a measure of said potentials as a function of shift in energy level of said Auger peaks.

14. The method of measuring electric potential on the surface of an object comprising the steps of
    depositing upon said surface a thin layer of material that yields at least one useful Auger peak,
    impinging upon said material first and second electron beams to stimulate first and second emissions of secondary electrons from either (a) two points or (b) the same point at different potentials, detecting an Auger peak in each of said first and second secondary electron emissions, and
    measuring the effective energy shift of the detected peak of said first emission relative to the detected peak of said second emission relative to the detected peak of said second emission to obtain a quantitative measure of potential on said surface as a function of said measured energy shift.

* * * * *

PO-1050
(5/69)

UNITED STATES PATENT OFFICE
CERTIFICATE OF CORRECTION

Patent No. 3,631,238  Dated December 28, 1971

Inventor(s) Noel C. MacDonald

It is certified that error appears in the above-identified patent and that said Letters Patent are hereby corrected as shown below:

Column 13, Claim 5, line 35, "(2)" should read --(a)--.

Column 14, Claim 12, line 32, after "identifying" insert --positions of said beam--.

Signed and sealed this 23rd day of January 1973.

(SEAL)
Attest:

EDWARD M. FLETCHER, JR.
Attesting Officer

ROBERT GOTTSCHALK
Commissioner of Patents